Oct. 6, 1931.   A. PETERSON   1,826,222
SAWING MACHINE
Filed May 7, 1930   5 Sheets-Sheet 1

Inventor:
Axel Peterson.
By Whiteley and Ruckman
Attorneys.

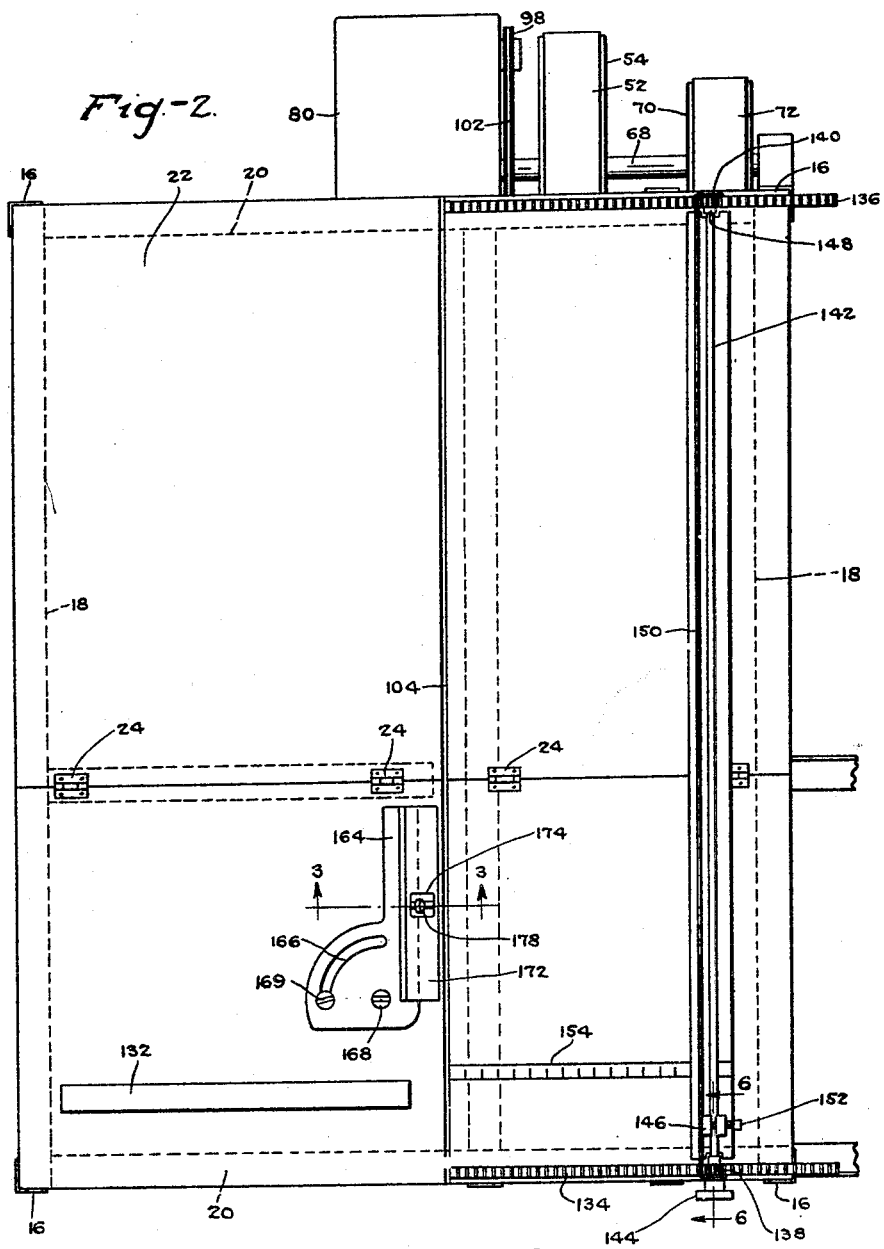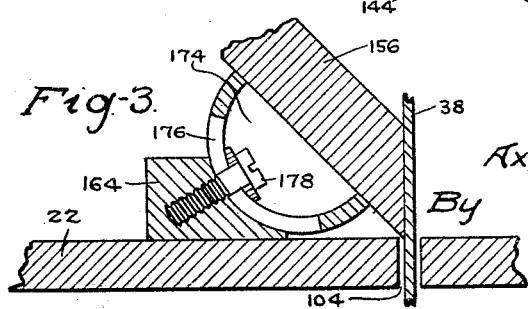

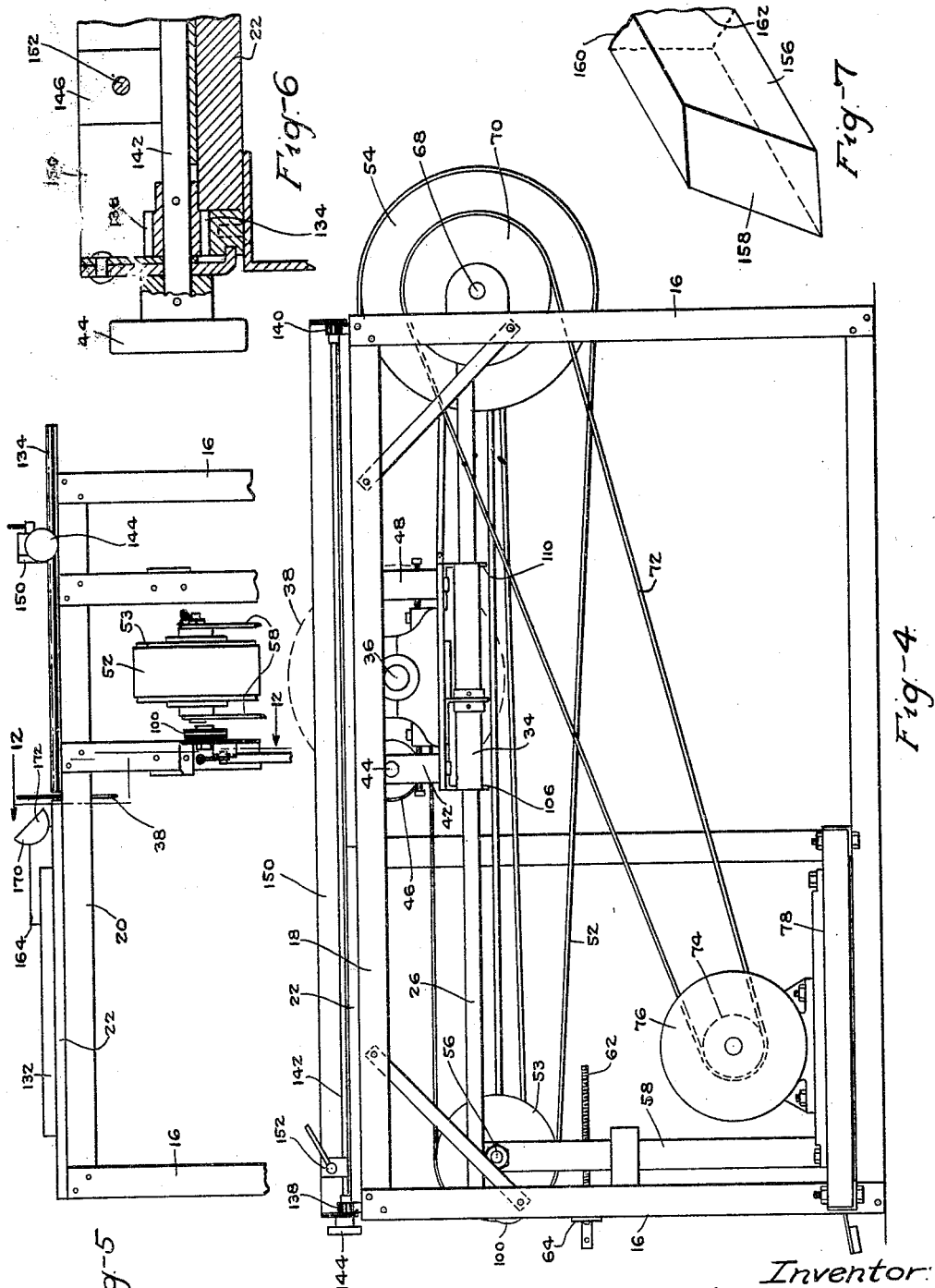

Oct. 6, 1931.　　　　A. PETERSON　　　　1,826,222
SAWING MACHINE
Filed May 7, 1930　　　5 Sheets-Sheet 4
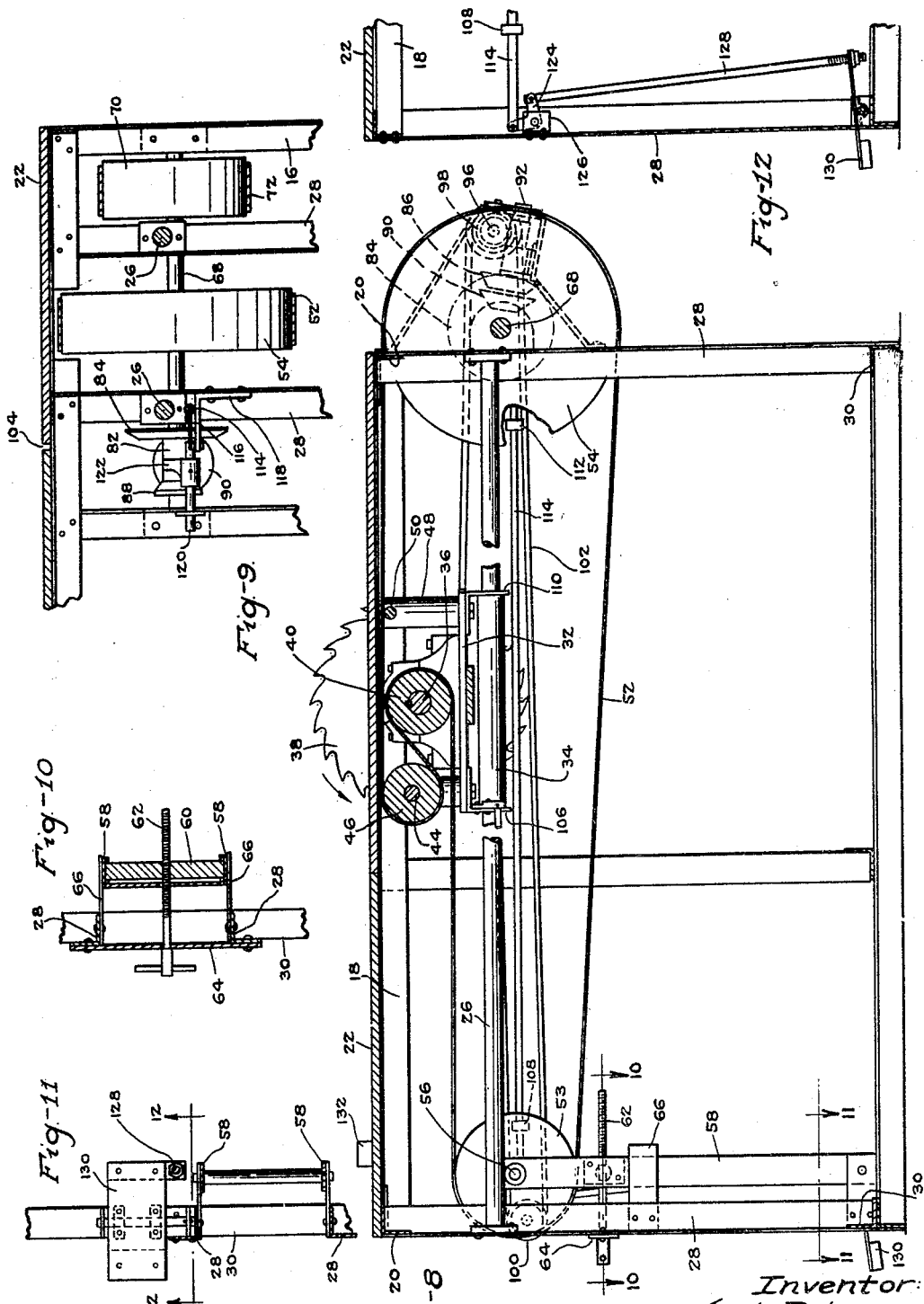
Inventor:
Axel Peterson.
By Whiteley and Ruckman
Attorneys.

Oct. 6, 1931.   A. PETERSON   1,826,222
SAWING MACHINE
Filed May 7, 1930   5 Sheets-Sheet 5

Inventor:
Axel Peterson.
By Whiteley and Luckman
Attorneys.

Patented Oct. 6, 1931

1,826,222

UNITED STATES PATENT OFFICE

AXEL PETERSON, OF MINNEAPOLIS, MINNESOTA

SAWING MACHINE

Application filed May 7, 1930. Serial No. 450,425.

My invention relates to sawing machines, and more particularly to machines by means of which lumber may be cut either crosswise or lengthwise as desired. Among the objects of the invention is the provision of a machine of this character which is accurate, safe and reliable in operation, and which is readily responsive to the will of the operator whereby the capacity of the machine is increased and the ease of operation is augmented. Another object is the provision of a machine in which a disk saw constantly rotated in a forward direction is mounted on a reciprocating carriage which at the end of its movement in both directions is automatically caused to reverse so that the reciprocating movement may be continued as long as desired without the intervention of the operator. Another object is the provision of means by which the operator may stop the reciprocation of the carriage at any point in its reciprocating movement either forward or backward, while allowing the saw to continue its rotation. Another object is the provision of means by which a piece of timber may be cut with any desired angle of bevel between 0° and 180°, both transversely and longitudinally or in other words, beveled to any desired extent in two directions.

The full objects and advantages of my invention will appear in connection with the detailed description thereof, and the novel features of my inventive idea will be particularly pointed out in the claim.

Figure 1:
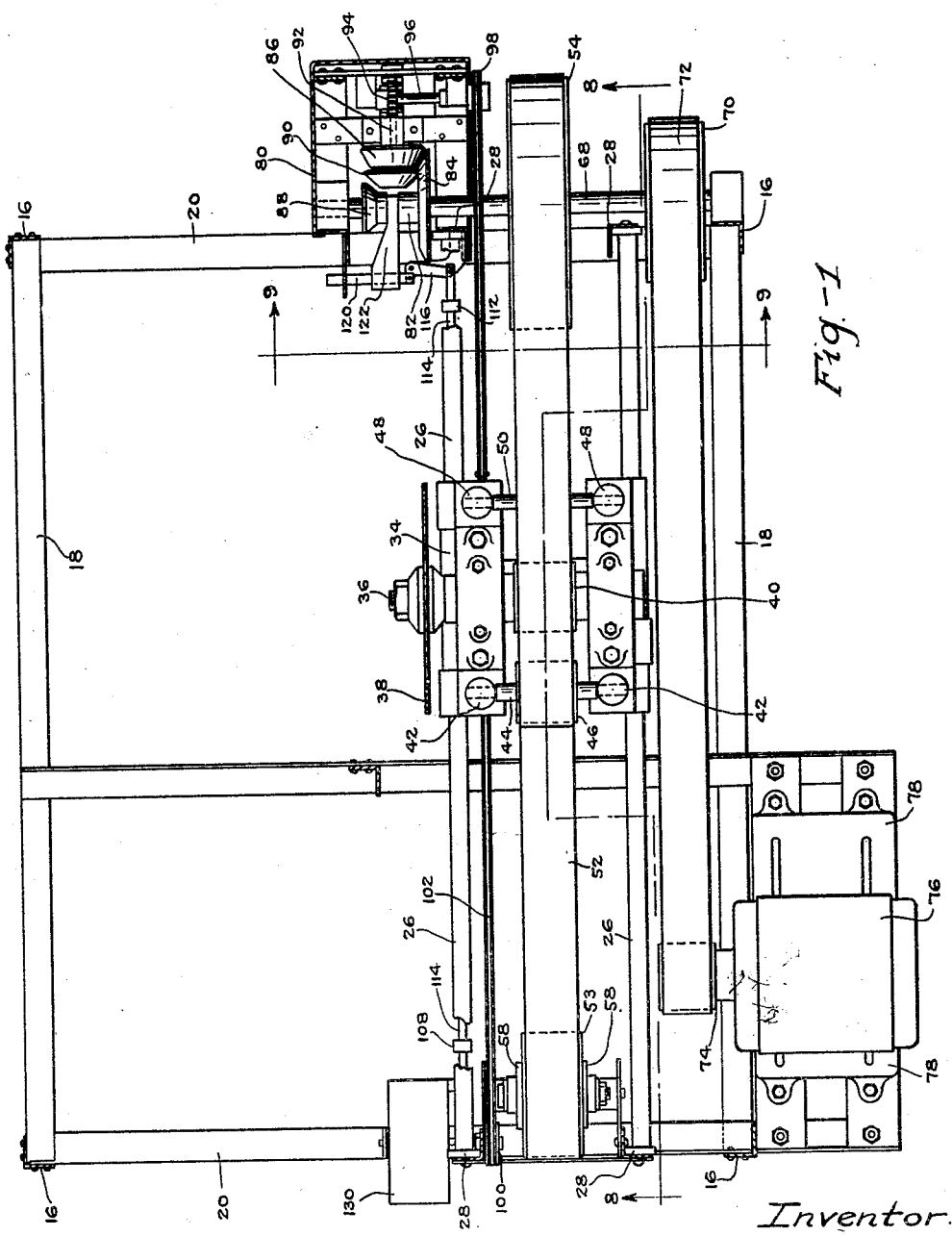
Figure 13:
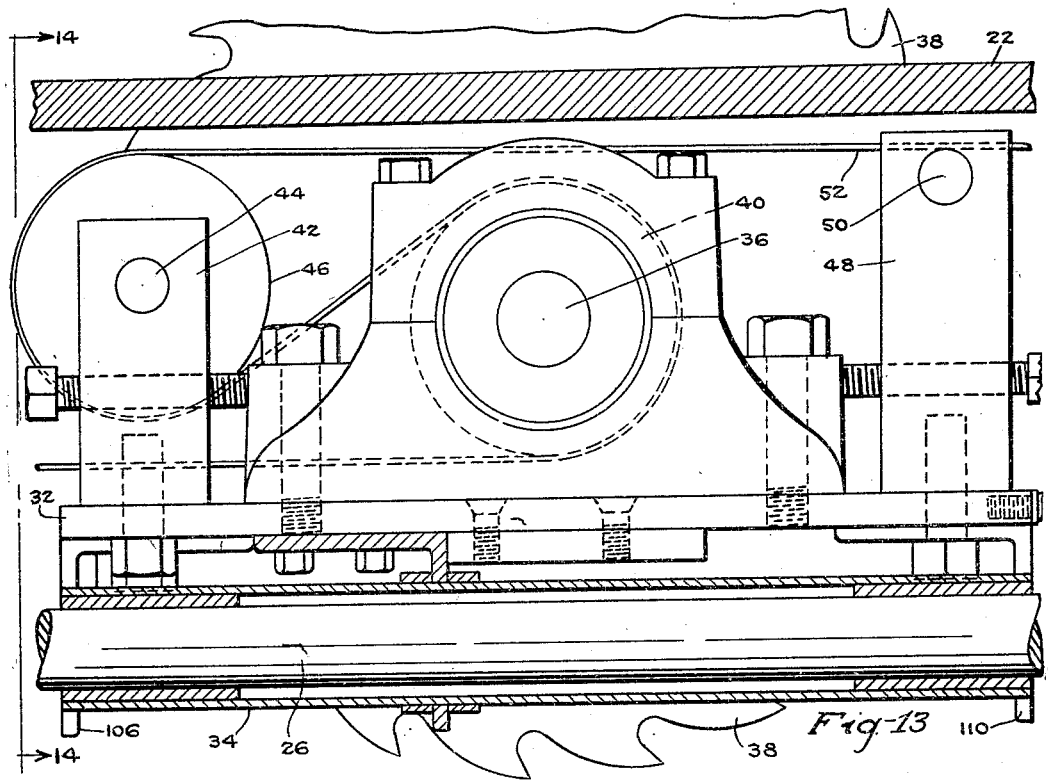
Figure 14:
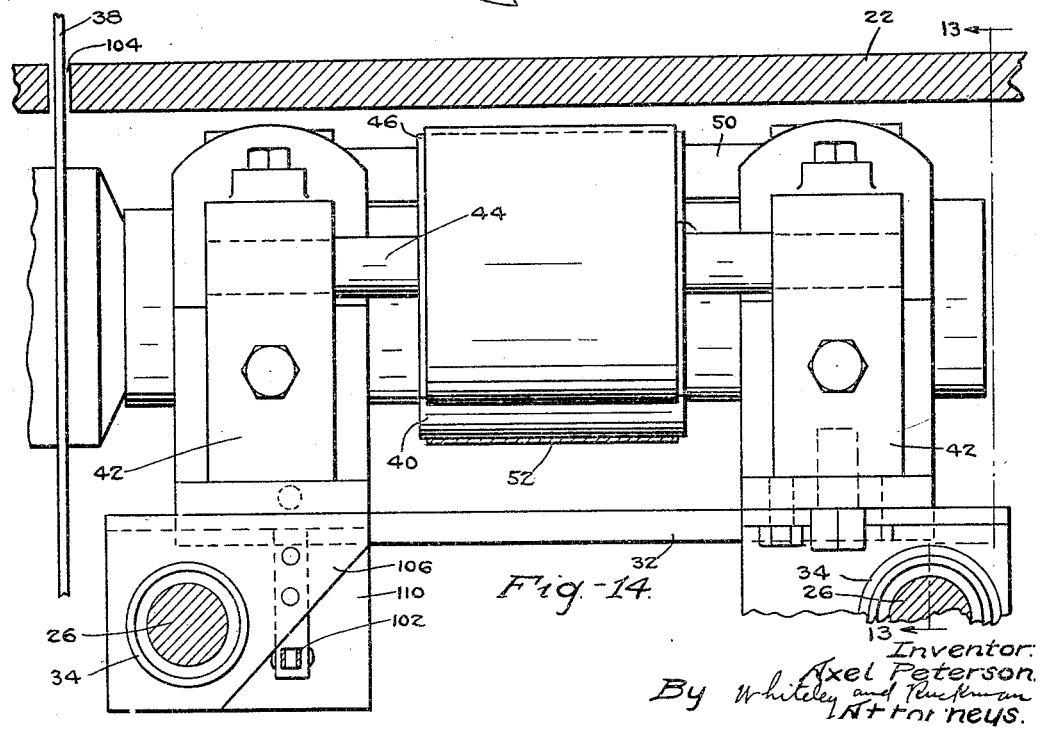

In the accompanying drawings which illustrate a practical embodiment of my invention, Fig. 1 is a top view of the machine showing it as it appears with the table removed. Fig. 2 is a top plan view. Fig. 3 is a detail view in section on the line 3—3 of Fig. 2. Fig. 4 (Sheet 3) is a side elevational view. Fig. 5 is an end view of the upper portion of the machine. Fig. 6 is a view in vertical section on the line 6—6 of Fig. 2 and on an enlarged scale. Fig. 7 is a perspective view showing a piece of timber cut on a bevel in two directions by the machine. Fig. 8 (Sheet 4) is a view in vertical section on the line 8—8 of Fig. 1. Fig. 9 is a view in vertical section on the line 9—9 of Fig. 1. Fig. 10 is a view in horizontal section on the line 10—10 of Fig. 8. Fig. 11 is a view in horizontal section on the line 11—11 of Fig. 8. Fig. 12 is a view in vertical section on the line 12—12 of Figs. 5 and 11. Fig. 13 (Sheet 5) is a detail view in vertical section on the line 13—13 of Fig. 14. Fig. 14 is a detail view in vertical section on the line 14—14 of Fig. 13.

As shown in the drawings, I provide a frame which includes four corner posts 16 connected at their upper ends by longitudinal frame members 18 and transverse frame members 20. A table 22 is supported by these posts and frame members. This table as shown in Fig. 2 is provided with hinges 24 in order that it may be swung up to give access to the underlying parts of the machine. As best shown in Figs. 1 and 8, two rods or track members 26 are supported at their ends in spaced relation to each other by standards 28 which extend between the upper frame members 20 and lower frame members 30. A carriage 32 is mounted for reciprocation on the track members 26 by means of cylindrical portions 34 which encircle and are slidable on the track members. The carriage 32 is provided with bearings for a transverse shaft 36 to the inner end of which a disk saw 38 is secured. A pulley 40 is secured to the middle portion of the shaft 36. One end of the carriage 32 is provided with a pair of standards 42 in the upper ends of which are bearings for a shaft 44 to which a pulley 46 is secured. The other end of the carriage 32 is provided with a pair of standards 48 whose upper ends carry a guide 50. An endless belt 52 passes under and part way around the pulley 40, then under and part way around the pulley 46, and then over the guide 50. The belt 52 also passes around pulleys 53 and 54 mounted at opposite ends of the machine frame. The pulley 53 is secured to a shaft 56 having bearings in the upper end of a pair of arms 58 whose lower ends are pivotally attached to the machine frame. The arms 58 are connected together toward their upper ends by a cross bar 60 as shown in Fig. 10. A screw 62 is threaded through the cross bar 60 and passes rotatably through a plate 64 secured to the frame members.

Upon turning this screw in the proper direction, the pulley 53 will be moved outwardly to tighten the belt 52, it being noted that the arms 58 are held for swinging movement between guides 66 extending inwardly from the frame. The pulley 54 is secured to a shaft 68 mounted in bearings secured to the frame. Secured to one end of the shaft 68, there is a pulley 70 having a belt 72 passing around the same and around a pulley 74 secured to the shaft of an electric motor 76 adjustably mounted on a base 78 carried by the frame of the machine near the floor. The motor 76 may be driven from any suitable source of electrical energy. The shaft 68 extends into a gear housing 80 and has a sleeve 82 splined thereon. This sleeve at one end carries a large bevel gear 84 adapted to be engaged with a bevel gear 86 and at the other end carries a small bevel gear 88 adapted to be engaged with a bevel gear 90. The bevel gears 86 and 90 are carried by shaft 92 mounted in bearings in the housing 80. A reduction gearing 94 is interposed between the shaft 92 and a shaft 96 mounted at right angles thereto. A sprocket wheel 98 is secured to the shaft 96 while a sprocket wheel 100 is mounted at the other end of the machine. A sprocket chain 102 passes around the sprocket wheels 98 and 100 and has its ends secured to the corresponding ends of the carriage 32. The table 22 is provided with a longitudinal slot 104 through which the upper portion of the saw 38 projects in order to permit reciprocating movement of the saw together with the carriage. In order to prevent the saw from going beyond the ends of the slot 104 and to reverse the direction of movement of the carriage, one end of the carriage is provided with a downward projection 106 adapted to move into engagement with a stop 108 while the other end of the carriage is provided with a downward projection 110 adapted to move into engagement with a stop 112 as will be understood from Figs. 8 and 12. The stops 108 and 112 are mounted on a rod 114, one end of which is pivotally attached to one end of a bell crank 116 as shown in Fig. 1, the bell crank being pivoted on a bracket 118 as shown in Fig. 9. The other end of this bell crank is pivotally attached to a slidable rod 120 to which a shifter arm 122 is secured, this shifter arm fitting into a circumferential groove in the sleeve 82. The opposite end of the rod 114 as shown in Fig. 12 is pivotally attached to the upper end of a bell crank 124 which is pivoted to a bracket 126 secured to the frame member 28. The other end of the bell crank 124 is pivotally attached to the upper end of a rod 128 whose lower end is secured to the inner end of a foot pedal 130 pivoted intermediate its ends on the lower portion of the frame.

The saw 38 is rotated by the belt 52 in a forwardly rotating direction regardless of the position of the carriage and may be used either for ripping or cross cutting. The table 22 near its forward end is provided with a transverse rest 132 for engagement by the material to be sawed. As shown in Fig. 2, the portion of the table at the right of the slot 104 is provided at its ends with racks 134 and 136 respectively which are engaged by pinions 138 and 140 respectively. These pinions are secured near the ends of a longitudinally extending rod 142 upon the forward end of which a knob 144 is secured for turning the rod. This rod is rotatable in bearing members 146 and 148 which carry a longitudinal guide 150. The bearing 146 as shown in Fig. 2 is split and provided with a screw 152 which when turned down holds the guide 150 in the position into which it has been adjusted by turning the knob 144. The top of the table is provided with graduations 154 transversely thereof by means of which the guide 150 may be set the desired distance from the path of travel of the saw.

I provide the machine with a device by means of which a piece of timber may be cut on a bevel in two directions. Fig. 7 shows a piece of timber 156 in which the inclined surface 158 is cut on a bevel with relation to the face 160 and also on a bevel with relation to the face 162. Figs. 2, 3, and 5 show a device by means of which both of these bevels may each be cut with any desired angle of inclination ranging between 0° and 180°. As shown, a support 164 has its forward end enlarged laterally and provided with a slot 166 which constitutes an arc of 90° having a pivot 168 as a center, this pivot extending through the member 164 and into the table. The member 164 is secured in adjusted position by a screw 169 which passes through the slot 166 and turns into the table at a fixed place. By loosening this screw, the member 164 may be adjusted for all angles of cut between 0° and 180°. The edge of the member 164 contiguous to the path of travel of the saw is curved to provide a seat for the curved surface of a semi-cylindrical member 170 having a flat face 172 for the timber to rest upon. A circular recess 174 is cut into the flat face 172, the bottom of this recess being concentric with the curved surface of the semi-cylindrical member 170. Midway of the ends of the recess 174, a groove 176 is cut through the bottom of the recess, this groove constituting an arc of 90°. A screw 178 passes through the groove 176 and turns into the block 164 for holding the member 170 in adjusted position. By loosening the screw 178, the member 170 may be adjusted for all angles of cut between 0° and 180°. This last mentioned adjustment determines the angle of cut transversely while the other adjustment referred to determines the angle of cut longitudinally.

The operation and advantages of my invention have to a large extent been set forth in the foregoing description. It will be understood that when the machine is in operation, the saw will be constantly rotated in the direction of the arrow shown in Fig. 8. Disregarding for the moment, any operation of the foot pedal 130, it will be understood that the carriage 32 carrying the saw with it reciprocates between limits determined by the particular setting of the stops 108 and 112. When one or the other of these stops is engaged by the carriage, the shifter 122 is operated through the bell crank 116 to either move the gear 188 into engagement with the gear 90 or to move the gear 84 into engagement with the gear 86, thus causing reversal of the direction of travel of the carriage so that the latter continues to reciprocate as long as power is being supplied by the motor. It will be noted that the gear 88 is much smaller than the gear 84 and therefore the retractive movement of the carriage is much quicker than the forward or cutting movement thereof. If at any time the operator wishes to discontinue the reciprocating movement of the carriage while allowing the saw to continue its rotation, he presses the foot pedal 130 in the proper direction to bring the sleeve 82 carrying the gears 84 and 88 into neutral position so that neither of these gears is in engagement with its cooperating gear. Small pieces of wood may now be sawed by pressing them against the rotating saw. By again stepping on the foot pedal, the reciprocation of the carriage may be continued.

I claim:

A sawing machine comprising a table containing an elongated slot, a disk saw having its upper portion projecting through said slot and adapted to reciprocate longitudinally therein, a support adjacent one side only of said slot, a vertical pivot attaching said support to said table whereby the free end of said support may be adjusted toward and away from said slot, a semi-cylindrical member mounted rockably adjustable upon and positioned longitudinally of said support, said member having a flat longitudinal face, and means for holding said member in differently adjusted positions on said support, the flat longitudinal face of said member constituting a rest for the material to be cut and said adjustments providing for cutting the material with various angles of bevel both transversely and longitudinally by a single forward movement of said saw.

In testimony whereof I hereunto affix my signature.

AXEL PETERSON.